United States Patent
Watanuki et al.

(10) Patent No.: US 10,025,048 B2
(45) Date of Patent: Jul. 17, 2018

(54) SEMICONDUCTOR DEVICE HAVING QUADRANGULAR INTERPOSER WITH FUNCTIONAL BLOCKS HAVING ARRANGED REGIONS AND WAVEGUIDES

(71) Applicant: Renesas Electronics Corporation, Koutou-ku, Tokyo (JP)

(72) Inventors: Shinichi Watanuki, Ibaraki (JP); Yasutaka Nakashiba, Ibaraki (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 15/648,214

(22) Filed: Jul. 12, 2017

(65) Prior Publication Data

US 2017/0315312 A1 Nov. 2, 2017

Related U.S. Application Data

(63) Continuation of application No. 15/186,528, filed on Jun. 19, 2016, now Pat. No. 9,739,964.

(30) Foreign Application Priority Data

Jul. 22, 2015 (JP) .................................. 2015-145180

(51) Int. Cl.
*G02B 6/42* (2006.01)
*G02B 6/43* (2006.01)
*G02B 6/12* (2006.01)

(52) U.S. Cl.
CPC .............. *G02B 6/428* (2013.01); *G02B 6/43* (2013.01); *G02B 2006/12061* (2013.01)

(58) Field of Classification Search
None
See application file for complete search history.

(56) References Cited

U.S. PATENT DOCUMENTS 7,150,569 B2 12/2006 Oono et al.
7,242,823 B2 7/2007 Karashima et al.
(Continued)

FOREIGN PATENT DOCUMENTS

| JP | H05-047622 A | 2/1993 |
| JP | H11-067639 A | 3/1999 |
| JP | 2003-023090 A | 1/2003 |

OTHER PUBLICATIONS

Google search re Hybrid Interposer Mar. 31, 2017.

*Primary Examiner* — Andrew Jordan
(74) *Attorney, Agent, or Firm* — Shapiro, Gabor and Rosenberger, PLLC

(57) ABSTRACT

An interposer includes a plurality of identical functional blocks arranged in the x direction, for example, and the functional blocks include a first region mounting a semiconductor chip, a second region mounting a light emitting element chip, a third region mounting a light receiving element chip, and a plurality of silicon waveguides. Then, the second and third regions are arranged between the first region and a first side along the x direction of the interposer. In addition, the plurality of silicon waveguides are arranged between the second region and the first side, and between the third region and the first side, extending from the second region toward the first side and from the third region toward the first side and are not formed between the functional blocks adjacent in the x direction.

5 Claims, 12 Drawing Sheets

(56) References Cited

U.S. PATENT DOCUMENTS

| | | |
|---|---|---|
| 7,931,411 B2 | 4/2011 | Kurita |
| 7,939,379 B2 | 5/2011 | Youn et al. |
| 9,071,364 B1 | 6/2015 | Voois et al. |
| 9,229,182 B2 | 1/2016 | Ishigami et al. |
| 9,297,971 B2 | 3/2016 | Thacker et al. |
| 9,508,662 B2 | 11/2016 | Kunishima et al. |
| 2006/0198570 A1 | 9/2006 | Ogawa et al. |
| 2007/0080458 A1 | 4/2007 | Ogawa et al. |
| 2009/0169219 A1 | 7/2009 | Nakano et al. |
| 2009/0310921 A1 | 12/2009 | Kurita |
| 2013/0070437 A1 | 3/2013 | Mohammed et al. |
| 2015/0026397 A1 | 1/2015 | Ping |
| 2016/0054521 A1 | 2/2016 | Kunishima et al. |
| 2016/0056115 A1 | 2/2016 | Kunishima et al. |
| 2016/0077283 A1 | 3/2016 | Webster et al. |
| 2016/0085038 A1 | 3/2016 | Decker et al. |
| 2016/0277115 A1 | 9/2016 | Peterson et al. |
| 2016/0334573 A1 | 11/2016 | Kunishima et al. |
| 2017/0023732 A1 | 1/2017 | Watanuki et al. |
| 2017/0031094 A1 | 2/2017 | Nakashiba et al. |
| 2017/0031095 A1 | 2/2017 | Nakashiba et al. |
| 2017/0038530 A1 | 2/2017 | Inada |
| 2017/0045683 A1 | 2/2017 | Usami |
| 2017/0315312 A1* | 11/2017 | Watanuki ................ G02B 6/43 |

* cited by examiner

SEMICONDUCTOR DEVICE HAVING QUADRANGULAR INTERPOSER WITH FUNCTIONAL BLOCKS HAVING ARRANGED REGIONS AND WAVEGUIDES

CROSS-REFERENCE TO RELATED APPLICATION

The present application claims priority from Japanese Patent Application No. 2015-145180 filed on Jul. 22, 2015, the content of which is hereby incorporated by reference into this application.

TECHNICAL FIELD OF THE INVENTION

The present invention relates to a semiconductor device and can be suitably utilized, for example, for a semiconductor device including a silicon interposer (simply referred to as an interposer, hereinafter) for integrating a plurality of identical large scale integration (LSI) circuits in which silicon photonics optical waveguides serve as input/output wires.

BACKGROUND OF THE INVENTION

A technique in which each functional block is mounted for each normal block in which an integrated circuit device is standardized by a fixed area is described in Japanese Patent Application Laid-Open Publication No. 2003-23090 (Patent Document 1).

Also, a technique in which an additional pattern in a triangular shape is formed on an end portion of a wiring pattern in a connection margin for stitching exposure is disclosed in Japanese Patent Application Laid-Open Publication No. H11-67639 (Patent Document 2).

Further, a technique of manufacturing an integrated circuit in which a dividing process from a large chip into a plurality of sub chips is particularly creatively designed so that a common mask can be used between the plurality of sub chips in most steps and a mask for a few steps only is separately prepared is disclosed in Japanese Patent Application Laid-Open Publication No. H5-47622 (Patent Document 3).

SUMMARY OF THE INVENTION

An interposer needs a large plane area in order to mount a plurality of chips. Since a silicon semiconductor process is used in silicon photonics, a region may be subjected to dividing to the extent that patterning can be performed by photomask depending on a plane area, in some cases. However, in the divided exposure, when an overlay shift of exposure masks due to an error of overlay accuracy of exposure masks is generated in boundary portions to be divided, small irregularities are formed on the surface of the silicon waveguide, and light is scattered, thereby generating a light propagation loss in the silicon waveguides. As a result, there is a need to eliminate an adverse effect caused by the overlay shift of exposure masks.

The other problems and novel characteristics of the present invention will be apparent from the description of the present specification and the accompanying drawings.

A semiconductor device according to one embodiment includes an interposer having a quadrangular planar shape, the interposer includes a plurality of identical functional blocks arranged in a first direction, and the functional blocks include a first region in which an electric device is arranged, a second region in which an optical device is arranged, and a plurality of optical waveguides. Also, the second region is arranged between the first region and a first side along the first direction of the interposer, and the plurality of optical waveguides are arranged between the second region and the first side and extend from the second region toward the first side.

According to one embodiment, a semiconductor device including an interposer which does not generate degradation of optical propagation characteristics in the silicon waveguides can be provided.

BRIEF DESCRIPTIONS OF THE DRAWINGS

DESCRIPTIONS OF THE PREFERRED EMBODIMENTS

Figure 1:
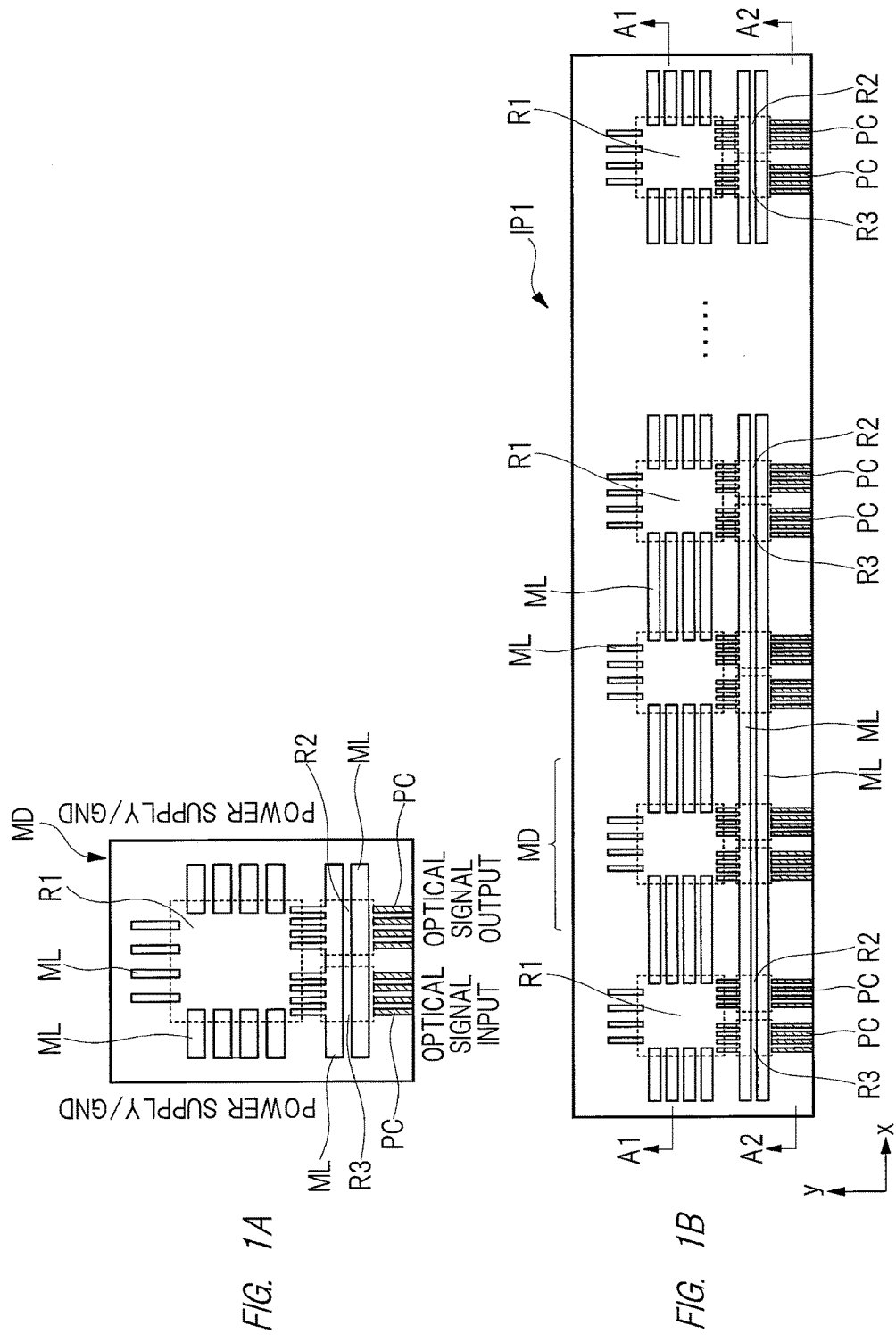
FIG. 1A is a plan view illustrating an essential part of a functional block constituting an interposer according to a first embodiment.
FIG. 1B is a plan view illustrating an essential part of the interposer.

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof.

Also, in the embodiments described below, when referring to the number of elements (including number of pieces, values, amount, range, and the like), the number of the elements is not limited to a specific number unless otherwise stated or except the case where the number is apparently limited to a specific number in principle. The number larger or smaller than the specified number is also applicable.

Further, in the embodiments described below, it goes without saying that the components (including element steps) are not always indispensable unless otherwise stated or except the case where the components are apparently indispensable in principle.

It is also obvious that expressions "composed of A," "made up of A," "having A," and "including A" do not exclude elements other than an element A, except a case where these expressions are defined as expressions that refer exclusively to the sole element A. Similarly, in the embodiments described below, when the shape of the components, positional relation thereof, and the like are mentioned, the substantially approximate and similar shapes and the like are included therein unless otherwise stated or except the case where it is conceivable that they are apparently excluded in principle. The same goes for the numerical value and the range described above.

Also, components having the same function are denoted by the same reference symbols throughout the drawings for describing the embodiments, and the repetitive description thereof is omitted. Also, in some drawings used in the embodiments, hatching is used for a silicon waveguide even in a plan view so as to make the drawings easy to see. Hereinafter, the embodiments of the present invention will be described in detail based on the drawings.

First, since it is considered that a semiconductor device according to an embodiment will be made clearer, the problem to be solved in an interposer which constitutes the semiconductor device found by the inventors of the present invention will be described in detail.

An interposer is a relaying substrate which connects substrates each having a different distance between terminals from one another and referred to as a wiring pitch conversion substrate. The interposer performs a conversion of a wiring pitch via a wiring board, for example, a build-up board and a thick film board, which facilitates high density wiring. However, when operating frequency of a system is also set to be higher as signal transmission amount dramatically increases, there is a limitation in an electrical wiring connection.

In recent years, a technique of realizing an optical communication module is achieved by manufacturing a transmission line for an optical signal made of silicon and using an optical circuit constituted by this transmission line for an optical signal as a platform to integrate a variety of optical devices and electronic devices, that is, a silicon photonics technique has been actively developed.

Compared to the case in which an electrical wire is used like a printed wiring board, use of a silicon waveguide as an optical wire considerably eliminates a bottleneck of transmission delay, thereby enabling a high-speed data transfer.

Figure 12:
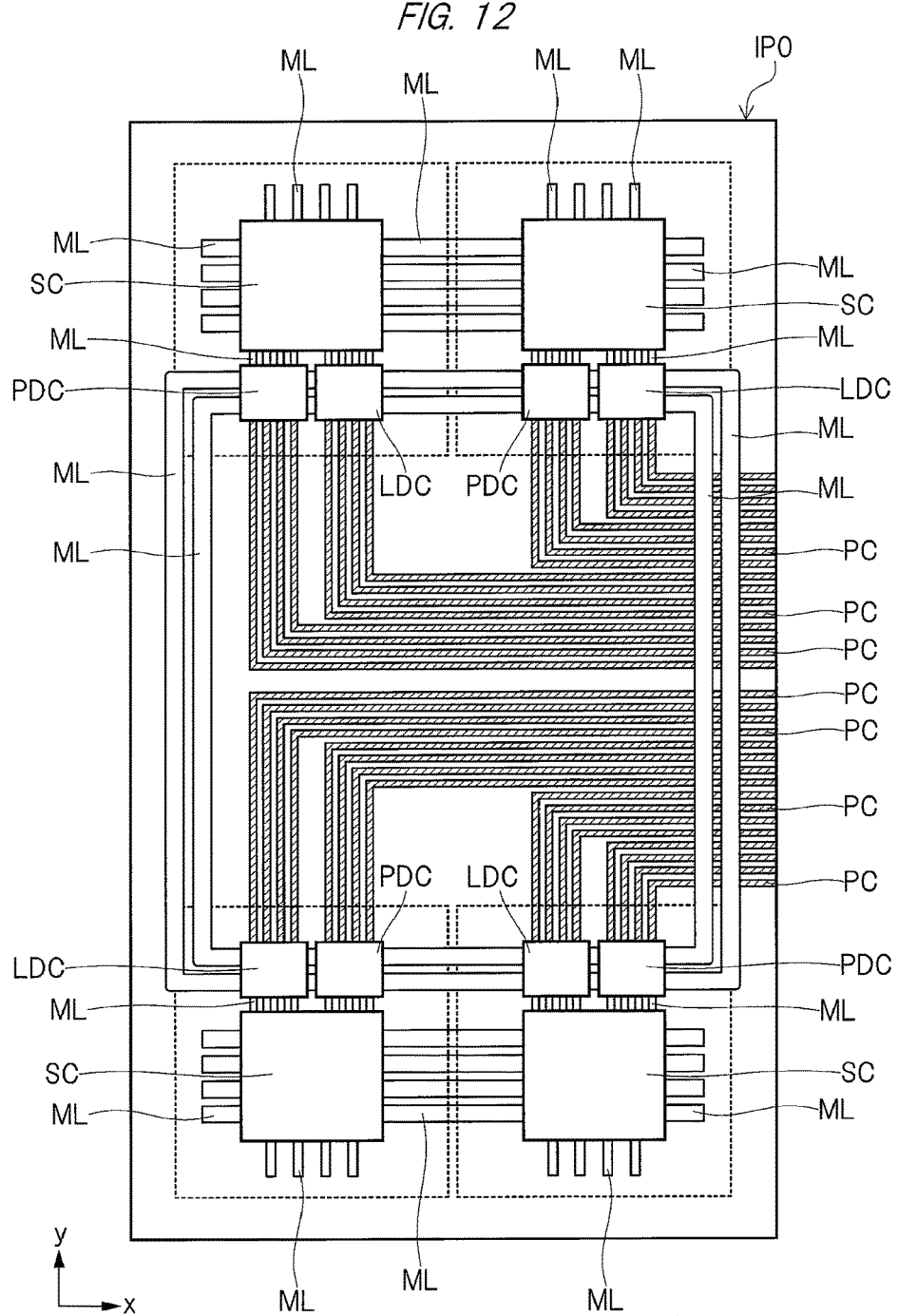
FIG. 12 is a plan view illustrating an essential part of a semiconductor device which is compared and examined by the inventors of the present invention.

FIG. 12 is a plan view illustrating an essential part of a semiconductor device which is compared and examined by the inventors of the present invention.

In FIG. 12, a multi-core in which four identical semiconductor chips SC are arranged in two rows×two columns on a main surface of an interposer IP0 is formed. Further, a single light emitting element (laser diode) chip LDC and a single light receiving element (photodiode) chip PDC are disposed adjacent to a single semiconductor chip SC.

The semiconductor chip SC and a power supply potential or a ground potential, the semiconductor chip SC and the light emitting element chip LDC, and the semiconductor chip SC and the light receiving element chip PDC are electrically connected by an electric wire ML made of a conductive material formed on the main surface of the interposer IP0. Meanwhile, an optical fiber, for example, is used for output of an optical signal from the light emitting element chip LDC and input of an optical signal to the light receiving element chip PDC, and the optical fiber is connected to the light emitting element chip LDC or the light receiving element chip PDC by a silicon waveguide PC.

However, as illustrated in FIG. 12, when one ends of the silicon waveguides PC to connect the optical fiber are collected at one side of the interposer IP0, at least two sheets of exposure masks each having a different pattern layout (an exposure mask for an upper region of the paper and an exposure mask for a lower region of the paper) are required in forming the silicon waveguide PC so as to expose a single silicon waveguide PC without dividing. Further, in the case where an area of a single semiconductor chip SC is large or the number of the semiconductor chips SC increases, the area of the interposer IP0 also increases, thereby requiring four or more sheets of exposure masks having pattern layouts different from one another.

In addition, in the layout of the silicon waveguide PC illustrated in FIG. 12, in forming the silicon waveguide PC by using four sheets of exposure masks, some silicon waveguides PC are formed by divided exposure. Use of the divided exposure generates an overlay shift of the exposure mask due to an error of overlay accuracy of the exposure mask in the boundary portion to be divided. When small irregularities due to the overlay shift of the exposure mask are formed on the surface of the silicon waveguide PC, light is scattered, resulting in a light propagation loss of the silicon waveguide PC. Since a singular dimensional change in the silicon waveguide PC leads to degradation of light propagation characteristics, even if an auxiliary pattern is added, it is not an essential solution to the light propagation loss.

Although collecting the electric wires ML has also been examined, the electric wires ML get longer, thereby generating a problem such as delay of an electric signal.

In addition, although a chemically amplified resist may be used in an exposure technique requiring fine processing, the chemically amplified resist changes with time, so that management of a process time is required. In particular, when a plurality of exposure masks, specifically three or more sheets of exposure masks are switched to expose, management of a process time becomes extremely difficult. Change with time in the chemically amplified resist can be a cause of degrading processing accuracy of the silicon waveguide PC, as well as a mechanical alignment shift of an exposure apparatus.

First Embodiment

Figure 2:
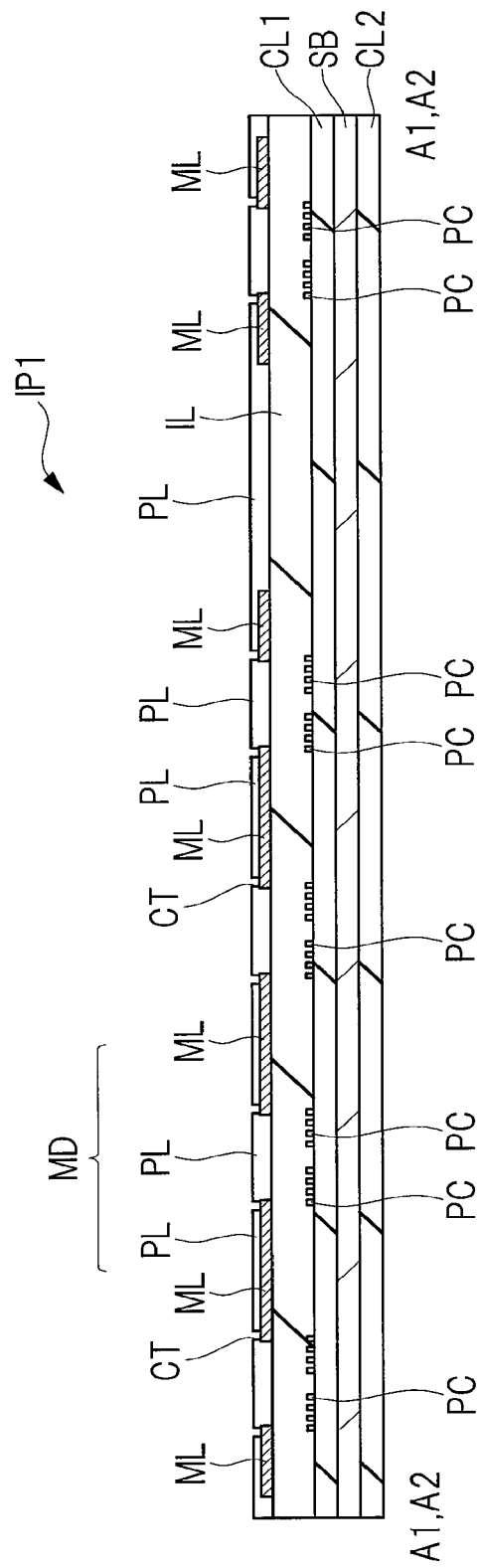
FIG. 2 is a cross-sectional view illustrating an essential part of the interposer in which a cross section taken along a line A1-A1 in FIG. 1B and a cross section taken along a line A2-A2 in FIG. 1B are depicted in combination.

A configuration of a semiconductor device according to a first embodiment will be described with reference to FIGS. 1 and 2. FIG. 1A is a plan view illustrating an essential part of a functional block constituting an interposer according to the first embodiment, and FIG. 1B is a plan view illustrating an essential part of the interposer, each indicating a plan view illustrating an essential part seen through a protective film, an interlayer dielectric film, and the like on a substrate. FIG. 2 is a cross-sectional view illustrating an essential part of the interposer in which a cross section taken along a line A1-A1 in FIG. 1B and a cross section taken along a line A2-A2 in FIG. 1B are depicted in combination.

As illustrated in FIGS. 1 and 2, a planar shape of an interposer IP1 which intersects with its thickness direction has a quadrangular shape, and sides along with an x direction are long sides while sides along with a y direction are short sides. The interposer IP1 has insulating films CL1 and CL2 on an upper surface and a lower surface of a substrate SB made of single-crystal silicon (Si), respectively, and a plurality of silicon waveguides PC made of silicon (Si) formed via the insulating film CL1 (also referred to as a BOX layer and a lower cladding layer) formed on the upper surface. Further, the interposer IP1 has an interlayer dielectric film IL (also referred to as an upper cladding layer) formed to cover the plurality of silicon waveguides PC, a plurality of electric wires ML formed on the interlayer dielectric film IL and made of a conductive material, and a protective film PL formed to cover the plurality of electric wires ML. An opening CT is formed in a part of the protective film PL, and a part of the electric wire ML is exposed on the bottom surface of the opening CT.

The interposer IP1 has a plurality of identical functional blocks MD arranged in the x direction, for example, and the functional blocks MD include a first region R1 in which a semiconductor chip is arranged, a second region R2 in which a light emitting element chip is arranged, and a third region R3 in which alight receiving element chip is arranged. Then, the second region R2 in which a light emitting element chip is arranged and the third region R3 in which a light receiving element chip is arranged are provided between the first region R1 in which a semiconductor chip is arranged and one of the long sides along the x direction of the interposer IP1.

Of the plurality of electric wires ML, power supply/GND lines to be electrically connected to a power supply potential or a ground potential extend, for example, in the x direction, and the functional blocks MD adjacent in the x direction are electrically connected to one another via the power supply/GND lines, respectively. Further, of the plurality of electric wires ML, signal lines extend, for example, in the y direction.

In contrast, all of the plurality of silicon waveguides PC for connecting to optical fibers, for example, extend in the y direction and are not formed between the functional blocks MD adjacent in the x direction. More specifically, the plurality of silicon waveguides PC extending in the y direction are arranged between the second region R2 in which a light emitting element chip is arranged and one of the long sides along the x direction of the interposer IP1, and between the third region R3 in which a light receiving element chip is arranged and one of the long sides along the x direction of the interposer IP1, respectively. That is, the plurality of silicon waveguides PC are not continuously formed between the functional blocks MD adjacent in the x direction and formed to be positioned within a single functional block MD.

Accordingly, as an exposure mask to be used in forming the silicon waveguides PC, only one sheet of exposure mask to expose a single functional block MD is required, so that cost for masks can be reduced and time management in an exposure process is facilitated as well.

In addition, since the plurality of silicon waveguides PC are formed to be positioned within a single functional block MD, exposing a single functional block MD with a sheet of exposure mask eliminates a need to use the divided exposure in forming the silicon waveguides PC. Thus, a problem that an overlay shift of an exposure mask is generated in the divided exposure is eliminated, so that a light propagation loss of the silicon waveguides PC due to the irregularities on the surfaces thereof can be avoided.

Figure 3:
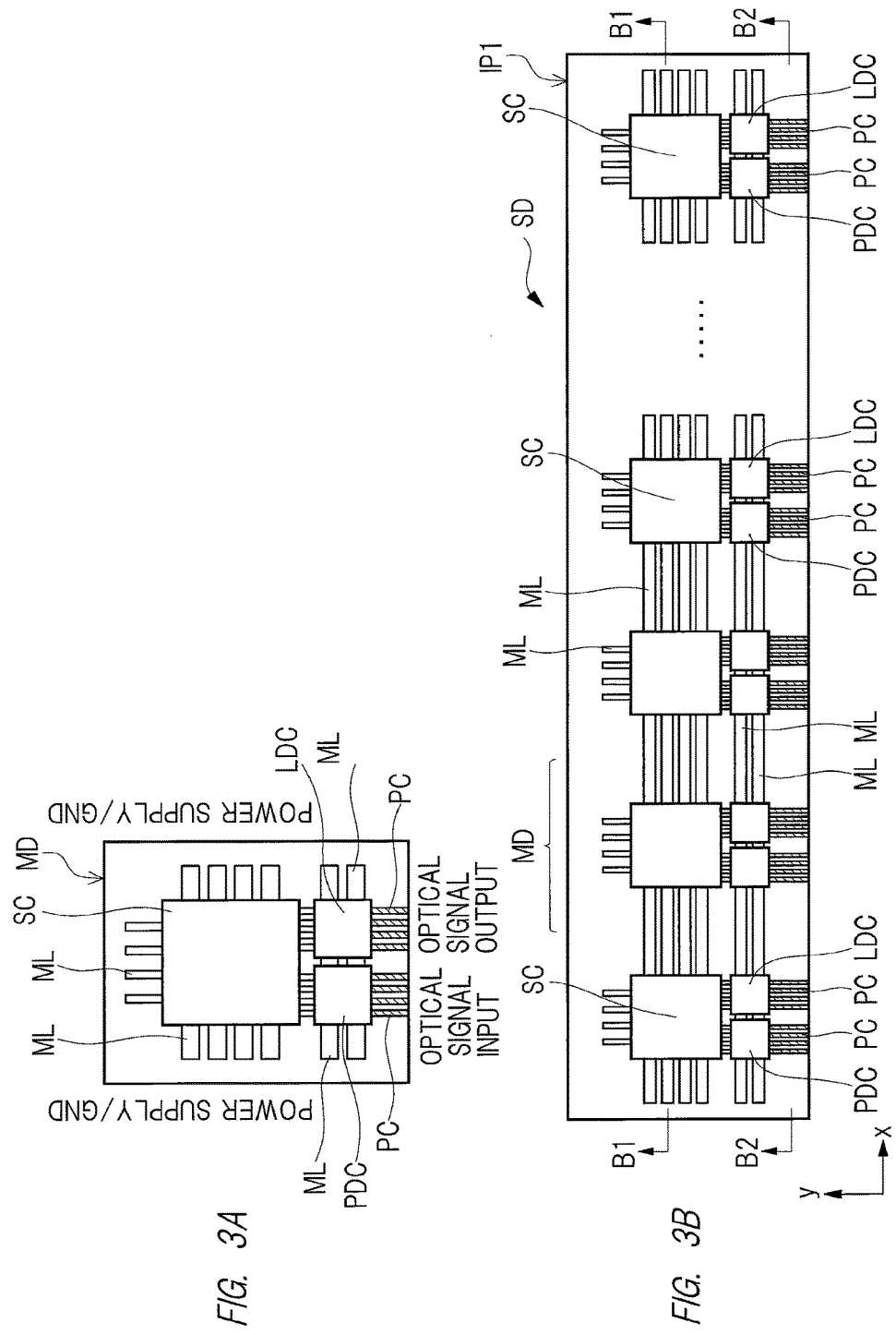
FIG. 3A is a plan view illustrating an essential part of a functional block constituting a semiconductor device according to the first embodiment.
FIG. 3B is a plan view illustrating an essential part of the semiconductor device.
Figure 4:
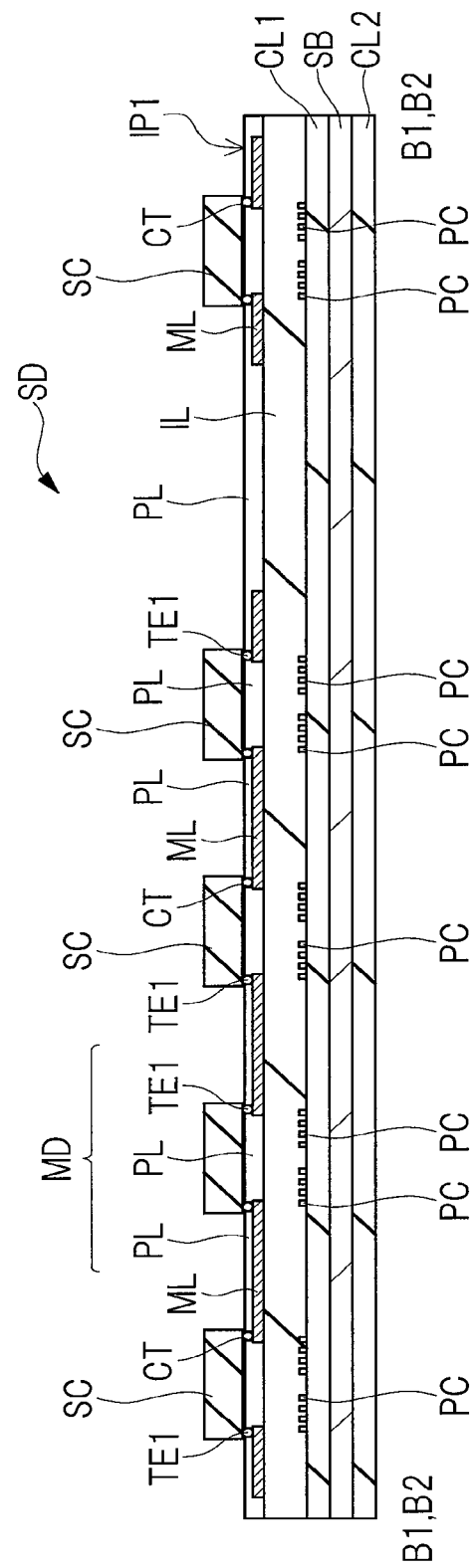
FIG. 4 is a cross-sectional view illustrating an essential part of the semiconductor device in which a cross section taken along a line B1-B1 in FIG. 3B and a cross section taken along a line B2-B2 in FIG. 3B are depicted in combination.

Next, the configuration of the semiconductor device according to the first embodiment will be described with reference to FIGS. 3 and 4. FIG. 3A is a plan view illustrating an essential part of the functional block constituting the semiconductor device according to the first embodiment, and FIG. 3B is a plan view illustrating an essential part of the semiconductor device, each indicating a plan view illustrating an essential part seen through a sealing resin film, a protective film, an interlayer dielectric film, and the like on the substrate. FIG. 4 is a cross-sectional view illustrating an essential part of the semiconductor device in which a cross section taken along a line B1-B1 in FIG. 3B and a cross section taken along a line B2-B2 in FIG. 3B are depicted in combination.

As illustrated in FIGS. 3 and 4, on the upper surface of the interposer IP1, the semiconductor chip SC, the light emitting element chip LDC, and the light receiving element chip PDC are in flip-flop connection via external terminals. More specifically, external terminals TE1 of the semiconductor chips SC are made to be opposed to the electric wires ML of the interposer IP1 and are allowed to connect facedown to the electric wires ML of the interposer IP1 all at once. Similarly, external terminals of the light emitting element chips LDC are made to be opposed to the electric wires ML of the interposer IP1 and are allowed to connect facedown to the electric wires ML of the interposer IP1 all at once. Similarly, external terminals of the light receiving element chips PDC are made to be opposed to the electric wires ML of the interposer IP1 and are allowed to connect facedown to the electric wires ML of the interposer IP1 all at once. Further, though not illustrated, the sealing resin film is formed on the upper surface of the interposer IP1 so as to cover the semiconductor chips SC, the light emitting element chips LDC, and the light receiving element chips PDC. A semiconductor integrated circuit device, for example, a logic circuit or a memory circuit, is formed in the semiconductor chip.

According to the first embodiment, the light emitting element chip LDC and the light receiving element chip PDC are used as a light emitting element and a light receiving element, respectively, but are not limited to this. For example, alight emitting element made of silicon (Si) which is present in the same layer as silicon (Si) constituting the silicon waveguides PC may be formed on the upper surface of the substrate SB via an insulating film CL1. In this case, a control chip for controlling the light emitting element can be mounted, or a control circuit can be formed on the upper surface of the substrate SB.

Similarly, a light receiving element made of silicon (Si) which is present in the same layer as silicon (Si) constituting the silicon waveguides PC may be formed on the upper surface of the substrate SB via an insulating film CL1. In this case, a control chip for controlling the light receiving element can be mounted, or a control circuit can be formed on the upper surface of the substrate SB.

In addition, the arrangement of the semiconductor chip SC, the light emitting element chip LDC, and the light receiving element chip PDC is not limited to the arrangement illustrated in FIGS. 3 and 4. Modification examples of the semiconductor device according to the first embodiment will be described below.

Figure 5A:
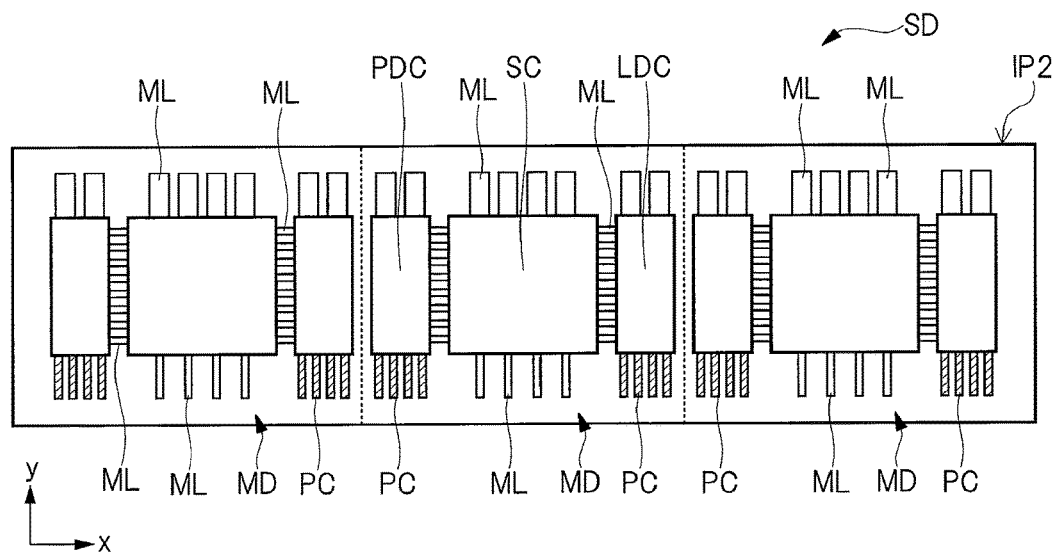
FIG. 5A is a plan view illustrating an essential part of a semiconductor device of a first modification example according to the first embodiment.
Figure 5B:
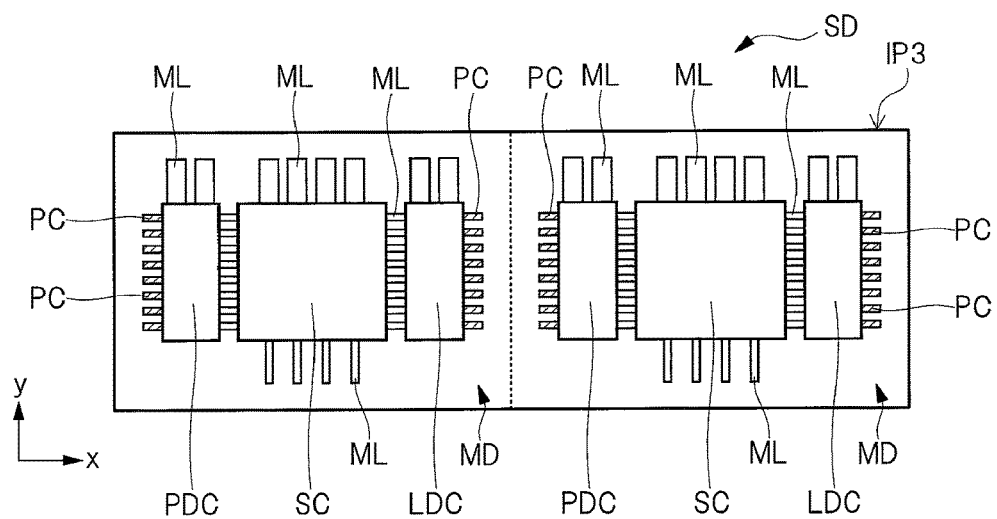
FIG. 5B is a plan view illustrating an essential part of a semiconductor device of a second modification example.

FIG. 5A is a plan view illustrating an essential part of the semiconductor device of a first modification example according to the first embodiment, and FIG. 5B is a plan view illustrating an essential part of the semiconductor device of a second modification example.

As illustrated in FIG. 5A, in the interposer IP2, the second region in which the light emitting element chip LDC is arranged and the third region in which the light receiving element chip PDC is arranged are provided on one side of the x direction and on the other side of the x direction, respectively, with the first region in which the semiconductor chip SC is arranged sandwiched therebetween, in a single functional block MD. Then, the semiconductor chip SC is mounted in the first region, the light emitting element chip LDC is mounted in the second region, and the light receiving element chip PDC is mounted in the third region.

Of the plurality of electric wires ML, power supply/GND lines to be electrically connected to a power supply potential or a ground potential extend in the y direction toward one of the long sides along the x direction of the interposer IP2, for example. Further, of the plurality of electric wires ML, signal lines extend in the x direction and the y direction, for example.

In contrast, all of the plurality of silicon waveguides PC for connecting to the optical fibers, for example, extend in the y direction and are not formed between the functional blocks MD adjacent in the x direction. More specifically, the plurality of silicon waveguides PC extending in the y direction are arranged between the second region in which the light emitting element chip LDC is arranged and the other of the long sides along the x direction of the interposer IP2, and between the third region in which the light receiving element chip PDC is arranged and the other of the long sides along the x direction of the interposer IP2, respectively. That is, the plurality of silicon waveguides PC are not continuously formed between the functional blocks MD adjacent in the x direction and are formed to be positioned within a single functional block MD.

In addition, as illustrated in FIG. 5B, in the interposer IP3, the second region in which the light emitting element chip LDC is arranged and the third region in which the light receiving element chip PDC is arranged are provided on one side of the x direction and on the other side of the x direction, respectively, with the first region in which the semiconductor chip SC is arranged sandwiched therebetween, in a single functional block MD, like the interposer IP2. Then, the semiconductor chip SC is mounted in the first region, the light emitting element chip LDC is mounted in the second region, and the light receiving element chip PDC is mounted in the third region.

Of the plurality of electric wires ML, power supply/GND lines to be electrically connected to a power supply potential or a ground potential extend in the y direction toward one of the long sides along the x direction of the interposer IP3, for example. Further, of the plurality of electric wires ML, signal lines extend in the x direction and the y direction, for example.

In contrast, all of the plurality of silicon waveguides PC for connecting to the optical fibers, for example, extend in the x direction and are not formed between the functional blocks MD adjacent in the x direction. More specifically, the plurality of silicon waveguides PC extending in the x direction are arranged between the second region in which the light emitting element chip LDC is arranged and one of the sides along the y direction of the functional block MD, and between the third region in which the light receiving element chip PDC is arranged and the other of the sides along the y direction of the functional block MD, respectively. That is, the plurality of silicon waveguides PC are not continuously formed between the functional blocks MD adjacent in the x direction and are formed to be positioned within a single functional block MD.

Accordingly, also in the first and second modification examples, only one sheet of exposure mask to be used in forming the silicon waveguides PC is required, so that cost for masks can be reduced and time management in an exposure process is facilitated as well.

In addition, exposing a single functional block MD with a sheet of exposure mask eliminates a need to use the divided exposure in forming the silicon waveguides PC. Thus, a problem that an overlay shift of an exposure mask is generated in the divided exposure is eliminated, so that a light propagation loss of the silicon waveguides PC due to the irregularities on the surfaces thereof can be avoided.

Figure 6:
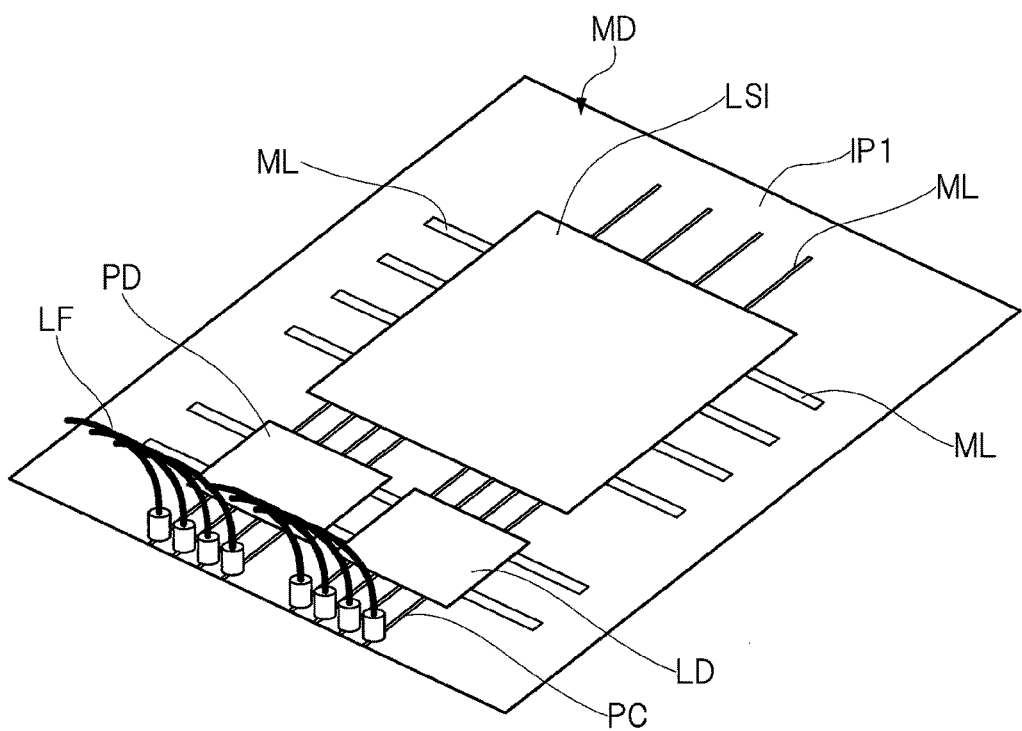
FIG. 6 is a schematic view describing a first connection method to an external optical system according to the first embodiment.
Figure 7:
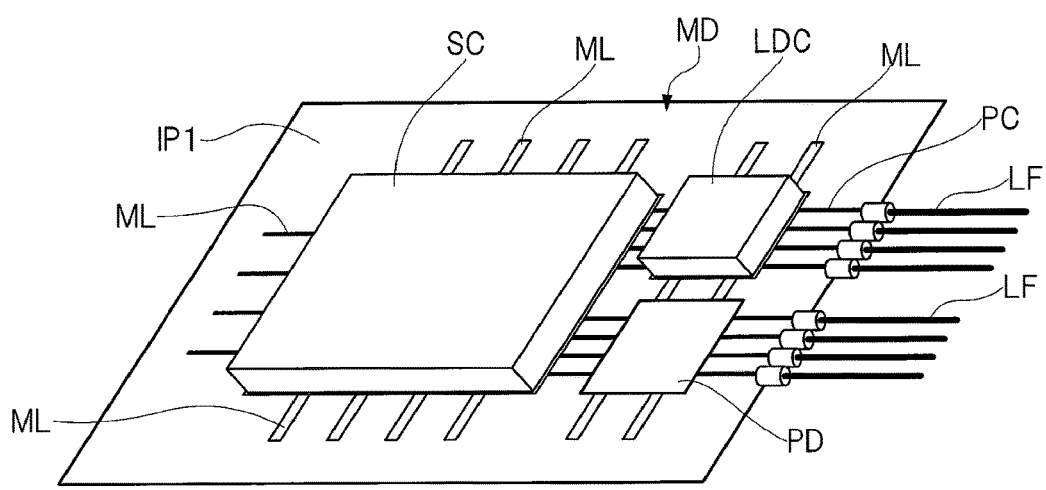
FIG. 7 is a schematic view describing a second connection method to an external optical system according to the first embodiment.

Next, a method of connecting the semiconductor device to an external optical system according to the first embodiment will be described with reference to FIGS. 6 and 7. FIG. 6 is a schematic view describing a first connection method to the external optical system according to the first embodiment. FIG. 7 is a schematic view describing a second connection method to the external optical system according to the first embodiment.

For example, light propagated through the silicon waveguide enters an external optical system, for example, an optical fiber. However, when the silicon waveguide and the optical fiber are directly connected, a large coupling loss is generated at the connection portion. Accordingly, it is required to reduce such a coupling loss by using a grating coupler, a spot size converter, or the like.

FIG. 6 is a schematic view illustrating a mode in which light propagating through the silicon waveguide PC formed in the interposer IP1 enters the optical fiber LF by using the grating coupler.

Light propagated through the silicon waveguide PC is diffracted and radiated in a specified direction in the grating coupler (not illustrated) by periodic refractive-index modulation (the irregularities on the surface, for example) provided along the propagating direction. Then, this diffracted and radiated light enters the optical fiber LF connected to the grating coupler.

FIG. 6 illustrates a functional block MD including a semiconductor integrated circuit LSI constituted by a plurality of semiconductor elements formed on the upper surface of the substrate, a light emitting element LD formed by using silicon (Si) present on the upper surface of the substrate, and a light receiving element PD formed by using silicon (Si) present on the upper surface of the substrate.

FIG. 7 is a schematic view illustrating a mode in which light propagating through the silicon waveguide PC formed in the interposer IP1 is output into the optical fiber LF by using the spot size converter.

The spot size converter (not illustrated) makes the spot size of the light propagated through the silicon waveguide PC approximately as large as the spot size of the optical fiber LF, and then, the light having the enlarged spot size enters the optical fiber LF. Thus, a coupling loss can be reduced.

FIG. 7 illustrates a functional block MD including a semiconductor chip SC, a light emitting element chip LDC, and a light receiving element PD formed by using silicon (Si) present on the upper surface of the substrate.

Figure 8:
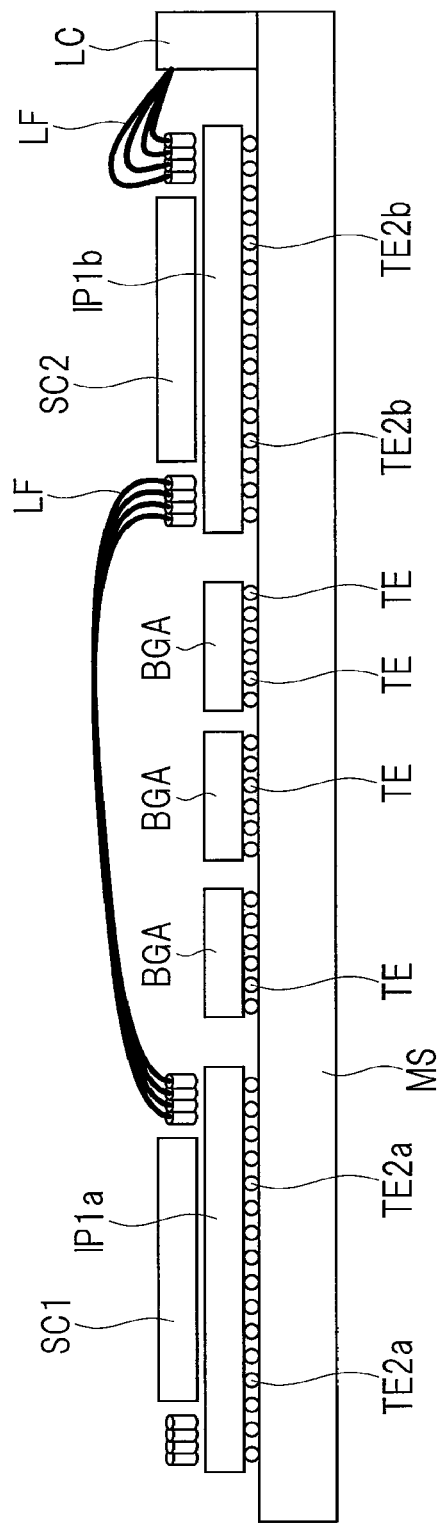
FIG. 8 is a pattern diagram illustrating the semiconductor devices in which silicon waveguides are connected to optical fibers by using grating couplers according to the first embodiment.
Figure 9:
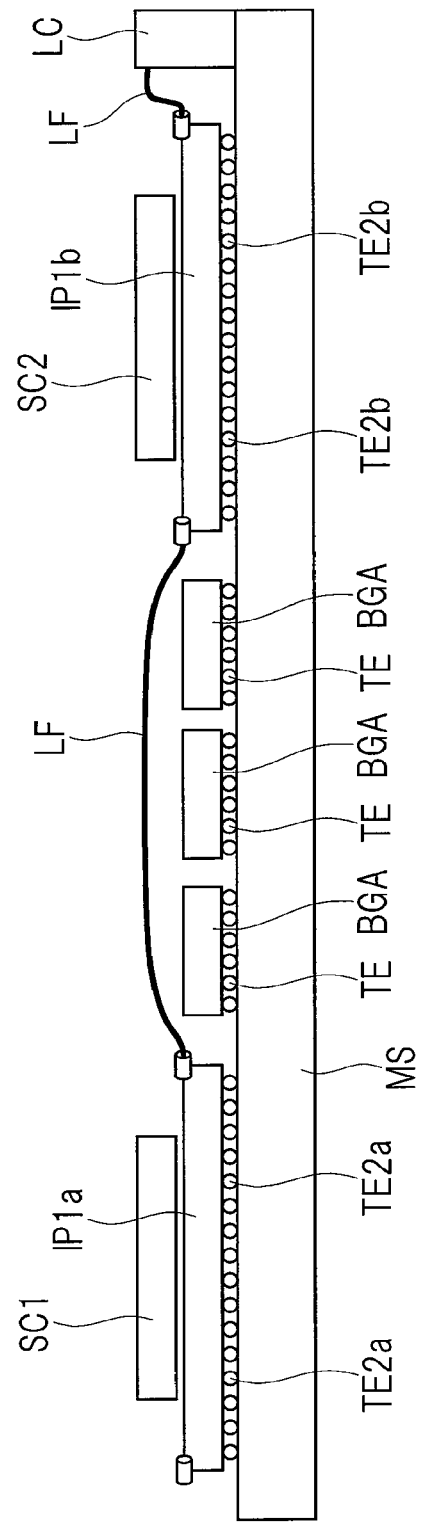
FIG. 9 is a pattern diagram illustrating the semiconductor devices in which silicon waveguides are connected to optical fibers by using spot size converters according to the first embodiment.

Next, modes of the plurality of semiconductor devices mounted on a printed wiring board according to the first embodiment will be described with reference to FIGS. 8 and 9. FIG. 8 is a pattern diagram illustrating the semiconductor devices in which the silicon waveguides are connected to the optical fibers by using the grating couplers according to the first embodiment. FIG. 9 is a pattern diagram illustrating the semiconductor devices in which the silicon waveguides are connected to the optical fibers by using the spot size converters according to the first embodiment.

As illustrated in FIGS. 8 and 9, an interposer IP1a on which a semiconductor chip SC1 having a logic circuit and the like formed therein, for example, is mounted, an interposer IP1b on which a semiconductor chip SC2 having a buffer memory formed therein, for example, is mounted, ball grid arrays BGAs, and the like are mounted on an upper surface of a printed wiring board MS (referred to also as a mounting board or a packaging board). The ball grid array BGA is a semiconductor device in which small ball-shaped external terminals TE made of solder are arranged in a grid pattern. Arranging these semiconductor devices on the upper surface of the printed wiring board MS can constitute a server, for example. Though not illustrated, a light emitting element and a light receiving element which are made of silicon (Si) are formed on first main surfaces of the interposers IP1a and IP1b, respectively.

External terminals TE2a and TE2b formed on second main surfaces of the interposers IP1a and IP1b, respectively, are electrically connected to a wiring layer formed on the upper surface of the printed wiring board MS for supplying power and connecting to some signal wires.

In contrast, a signal can be interactively transmitted between the semiconductor chip SC1 mounted on the first main surface of the interposer IP1a and the semiconductor chip SC2 mounted on the first main surface of the interposer IP1b via the optical fibers LF. Further, a signal is transmitted from the server to the outside via the optical fiber LF and an optical connector LC. Thus, by using the optical fibers LF, light can be propagated even over a relatively long distance with no propagation loss without being affected by noise, so that there is an advantage of increasing the freedom of arranging the interposers IP1a and IP1b on the printed wiring board MS.

Figure 10:
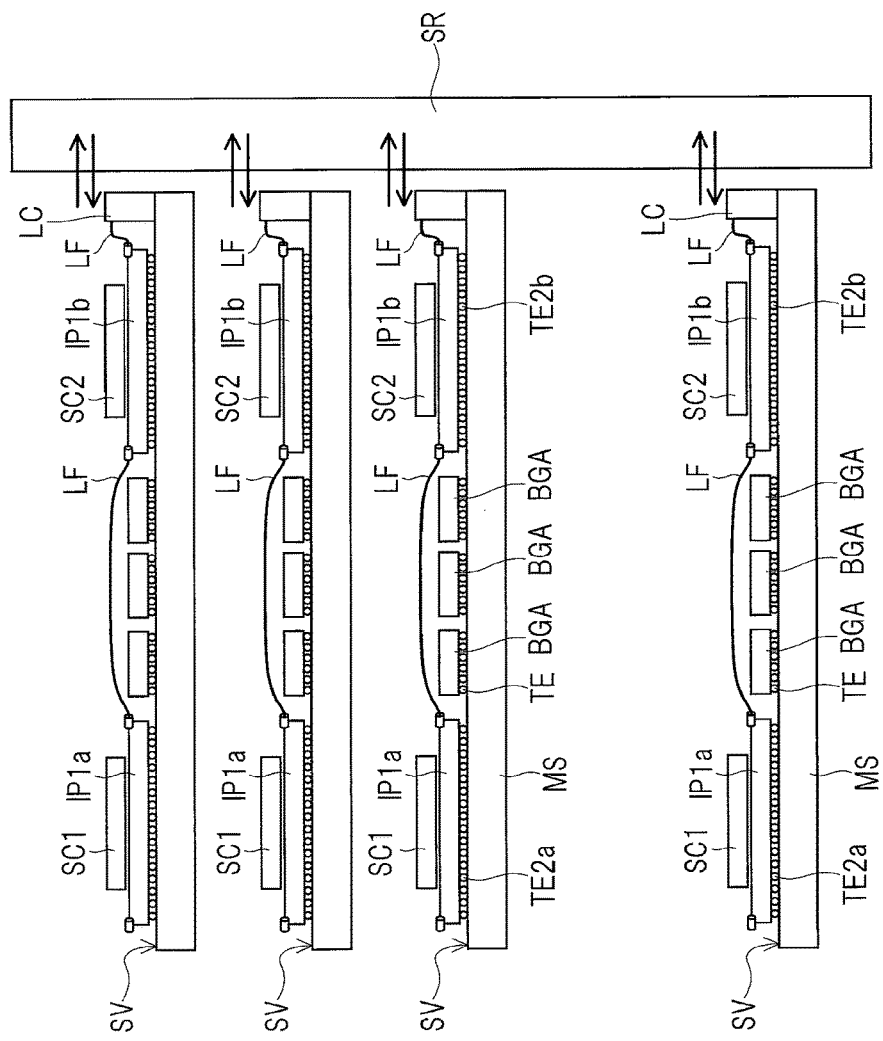
FIG. 10 is a conceptional view illustrating a server cluster according to the first embodiment.

Next, an example of a server cluster in which a plurality of servers according to the first embodiment are connected will be described with reference to FIG. 10. FIG. 10 is a conceptional view illustrating the server cluster according to the first embodiment. The server cluster indicates a group of independent servers working together as a single system, and a server configuration requiring an I/O connection is illustrated herein. FIG. 10 illustrates the semiconductor devices which are shown in FIG. 9 and connected to the optical fibers by using the spot size converters, but semiconductor devices are not limited to this.

As illustrated in FIG. 10, a plurality of servers SV mounted on a server rack SR are connected to an interface which is common to one another via the optical connectors LC, for example. By operating either one of the plurality of servers SV, high availability can be achieved. In the first embodiment, since the semiconductor chip SC1 and the semiconductor chip SC2 which constitute each server SV are connected with each other via the optical fibers LF, and further, each server SV is connected to the interface via the optical connector LC, a large-capacity transmission with an extremely reduced transmission loss over a long distance can be performed.

Thus, according to the first embodiment, since the divided exposure is not required in forming the silicon waveguides PC, a problem that an overlay shift of an exposure mask is generated in the divided exposure is eliminated, thereby avoiding a light propagation loss of the silicon waveguides PC due to the irregularities on the surfaces thereof. Further, only one sheet of exposure mask to be used in forming the silicon waveguides PC is required, so that cost for masks can be reduced and time management in an exposure process is facilitated as well.

Note that, in the first embodiment, exposure without requiring the divided exposure is performed in forming the silicon waveguides PC, and it is also possible to perform exposure without requiring the divided exposure in forming the electric wires ML and to form the electric wires ML which are not disposed across the divided boundary of the exposure mask.

Second Embodiment

Figure 11:
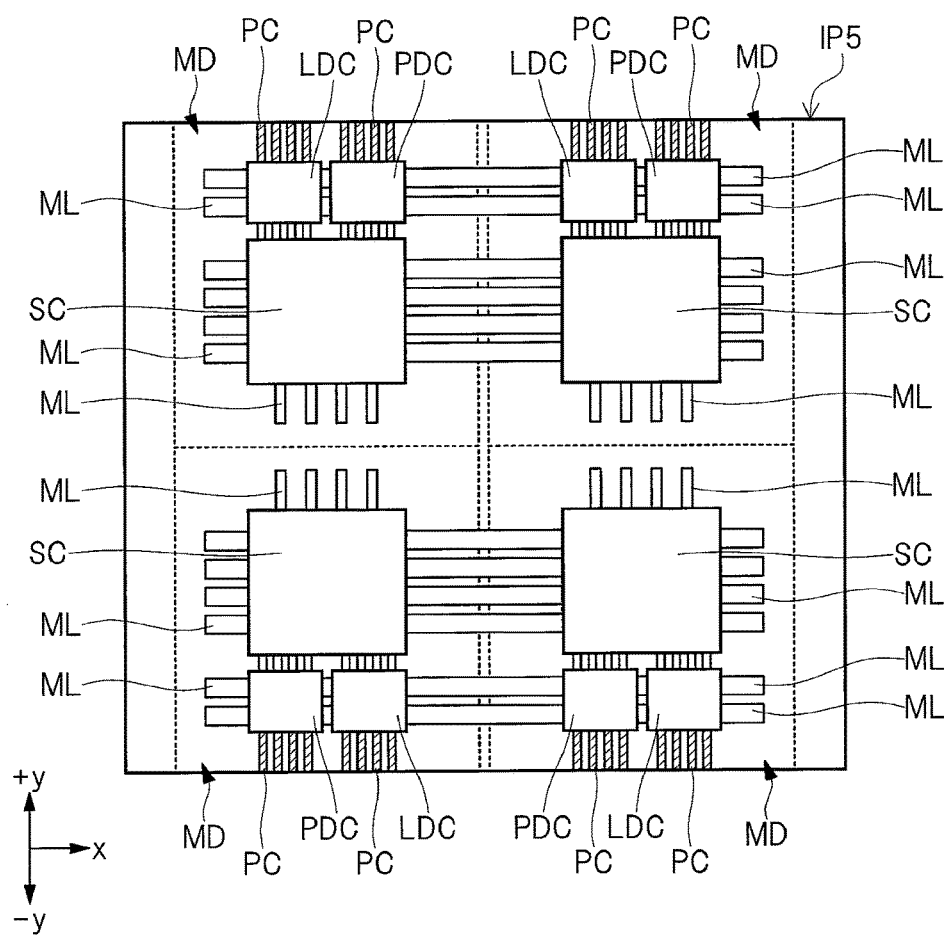
FIG. 11 is a plan view illustrating an essential part of a semiconductor device according to a second embodiment.

A configuration of a semiconductor device according to a second embodiment will be described with reference to FIG. 11. FIG. 11 is a plan view illustrating an essential part of an interposer according to the second embodiment and indicates a plan view illustrating an essential part seen through a protective film and an interlayer dielectric film on a substrate.

As illustrated in FIG. 11, four functional blocks MD are arranged in two rows×two columns on a main surface of an interposer IP5. In the interposer IP5, a second region in which a light emitting element chip LDC is arranged and a third region in which a light receiving element chip PDC is arranged are provided between a first region in which a semiconductor chip SC is arranged and either of the sides along the x direction of the interposer IP5, respectively, in a single functional block MD, like the functional block MD of the interposer IP1. Then, the semiconductor chip SC is mounted in the first region, the light emitting element chip LDC is mounted in the second region, and the light receiving element chip PDC is mounted in the third region.

Further, in the two functional blocks MD adjacent in the y direction, the layout is inverted between the two functional blocks. That is, in the two functional blocks MD positioned on an upper region of the paper, the second region in which the light emitting element chip LDC is arranged and the third region in which the light receiving element chip PDC is arranged are positioned between the first region in which the semiconductor chip SC is arranged and one of the sides along the x direction of the interposer IP5 on the +y direction side. Then, the plurality of waveguides PC are arranged between the second region in which the light emitting element chip LDC is arranged and the one of the sides along the x direction of the interposer IP5 on the +y direction side, and between the third region in which the light receiving element chip PDC is arranged and the one of the sides along the x direction of the interposer IP5 on the +y direction side, respectively.

In the two functional blocks MD positioned on a lower region of the paper, the second region in which the light emitting element chip LDC is arranged and the third region in which the light receiving element chip PDC is arranged are positioned between the first region in which the semiconductor chip SC is arranged and the other of the sides along the x direction of the interposer IP5 on the −y direction side. Then, the plurality of silicon waveguides PC are arranged between the second region in which the light emitting element chip LDC is arranged and the other of the sides along the x direction of the interposer IP5 on the −y direction side, and between the third region in which the light receiving element chip PDC is arranged and the other of the sides along the x direction of the interposer IP5 on the −y direction side, respectively.

Of the plurality of electric wires ML, power supply/GND lines to be electrically connected to a power supply potential or a ground potential extend, for example, in the x direction, and the functional blocks MD adjacent in the x direction are electrically connected to one another via the power supply/GND lines, respectively. Further, of the plurality of electric wires ML, signal lines extend, for example, in the y direction.

In contrast, all of the plurality of silicon waveguides PC for connecting to the optical fibers, for example, extend in the y direction and are not formed between the functional blocks MD adjacent in the x direction and between the functional blocks MD adjacent in the y direction. More specifically, the plurality of silicon waveguides PC extending in the y direction are arranged between the second region in which the light emitting element chip LDC is arranged and the one of the sides along the x direction of the interposer IP5, and between the third region in which the light receiving element chip PDC is arranged and the one of the sides along the x direction of the interposer IP5, respectively, or between the second region and the other of the sides along the x direction of the interposer IP5, and between the third region and the other of the sides along the x direction of the interposer IP5, respectively. That is, the plurality of silicon waveguides PC are not continuously formed between the functional blocks MD adjacent in the x direction or in the y direction and are formed to be positioned within a single functional block MD.

Accordingly, exposing a single functional block MD with a sheet of exposure mask eliminates a need to use the divided exposure in forming the silicon waveguides PC. Thus, a problem that an overlay shift of an exposure mask is generated in the divided exposure is eliminated, so that a light propagation loss of the silicon waveguides PC due to the irregularities on the surfaces thereof can be avoided.

However, in the second embodiment, since the layouts of the two functional blocks MD adjacent in the y direction are different from each other, two sheets of exposure masks (an exposure mask for the upper region of the paper and an exposure mask for the lower region of the paper) are required in forming the silicon waveguides PC. Accordingly, it is effective for an exposure apparatus having a switching function of two sheets of exposure masks in one exposure process. In addition, in the second embodiment, when the two functional blocks MD adjacent in the y direction can be exposed all at once, only one sheet of exposure mask to be used in forming the silicon waveguides PC is required, so that cost for masks can be reduced and time management in an exposure process is facilitated as well.

Thus, according to the second embodiment, since the divided exposure is not required in forming the silicon waveguides PC, a problem that an overlay shift of an exposure mask is generated in the divided exposure is eliminated, thereby avoiding a light propagation loss of the silicon waveguides PC due to the irregularities on the surfaces thereof.

In the foregoing, the invention made by the inventors of the present invention has been concretely described based on the embodiments. However, it is needless to say that the present invention is not limited to the foregoing embodiments and various modifications and alterations can be made within the scope of the present invention.

What is claimed is:

1. A semiconductor device comprising:
   an interposer having a quadrangular planar shape including first and second sides along a first direction and third and fourth sides along a second direction being perpendicular to the first direction,
   wherein the interposer includes a first functional block and a second functional block being adjacent to the first function block in the second direction,
   wherein each of the first and second functional blocks includes a first region in which an electric device is arranged, a second region in which an optical device is arranged, and a plurality of optical waveguides,
   wherein the second region of the first functional block is arranged between the first region of the first functional block and the first side,
   wherein the optical waveguides of the first functional block are arranged between the second region of the first functional block and the first side, and extend from the second region of the first functional block to the first side,
   wherein the second region of the second functional block is arranged between the first region of the second functional block and the second side, and
   wherein the optical waveguides of the second functional block are arranged between the second region of the second functional block and the second side, and extend from the second region of the second functional block to the second side.

2. The semiconductor device according to claim 1, wherein the interposer includes:
   a substrate made of silicon;
   a first insulating film formed on an upper surface of the substrate;
   the optical waveguides made of silicon and formed on the first insulating film;
   a second insulating film formed to cover the optical waveguides; and
   a plurality of electric wires formed on the second insulating film.

3. The semiconductor device according to claim 2, wherein the interposer further includes a third functional block being adjacent to the first functional block in the first direction, and
   wherein a power supply potential wire or a ground potential wire of the electric wires extend in the first direction so as to be arranged between the first functional block and the third functional block.

4. The semiconductor device according to claim 1, wherein, for one of the first and second functional blocks, the optical device is made of silicon that is present in a same layer as silicon constituting the plurality of optical waveguides.

5. The semiconductor device according to claim 2, wherein the optical waveguides of the first and second functional blocks do not extend in the second direction.

* * * * *